INVENTORS.
JOHN P. MANN
BRYAN WRIGHT
CLIFFORD C. LARSON
BY
Wheeler, Wheeler + Wheeler
ATTORNEYS.

June 29, 1965  J. P. MANN ETAL  3,191,974
HOSE SWIVEL ATTACHMENT FOR ROLLING FLUID TRANSPORTERS
Filed March 10, 1961  2 Sheets-Sheet 2

INVENTORS.
JOHN P. MANN
BY BRYAN WRIGHT
CLIFFORD C. LARSON

Wheeler, Wheeler + Wheeler
ATTORNEYS.

United States Patent Office 3,191,974
Patented June 29, 1965

3,191,974
HOSE SWIVEL ATTACHMENT FOR ROLLING FLUID TRANSPORTERS
John P. Mann, Bryan Wright, and Clifford C. Larson, Clintonville, Wis., assignors to FWD Corporation, Clintonville, Wis., a corporation of Wisconsin
Filed Mar. 10, 1961, Ser. No. 94,910
2 Claims. (Cl. 285—158)

This invention relates to a hose swivel attachment for rolling fluid transporters.

The object of the invention is to provide a fluid tight swivel bearing for a filling or emptying fitting on the soft metal hub of a rolling fluid transporter, said bearing being durable in service and being capable of disassembly entirely from the outside of said hub. A further object is to provide such a bearing which may be applied either to rolling fluid transporters having swivel bearings of other designs or to units manufactured to receive a bearing of the present type.

The invention consists of a steel sleeve adapted to make a fluid tight connection with the end of an aluminum elbow upon which a fluid carrying hose is mounted, a second steel sleeve concentric with the first and in rotatable fluid tight connection therewith, the second sleeve being provided with a bolt flange for connection with a recessed portion of the wheel hub of the rolling fluid transporter, various elastomeric seals, and retaining rings and pins to removably retain the parts in the assembled relationship.

Figure 1:
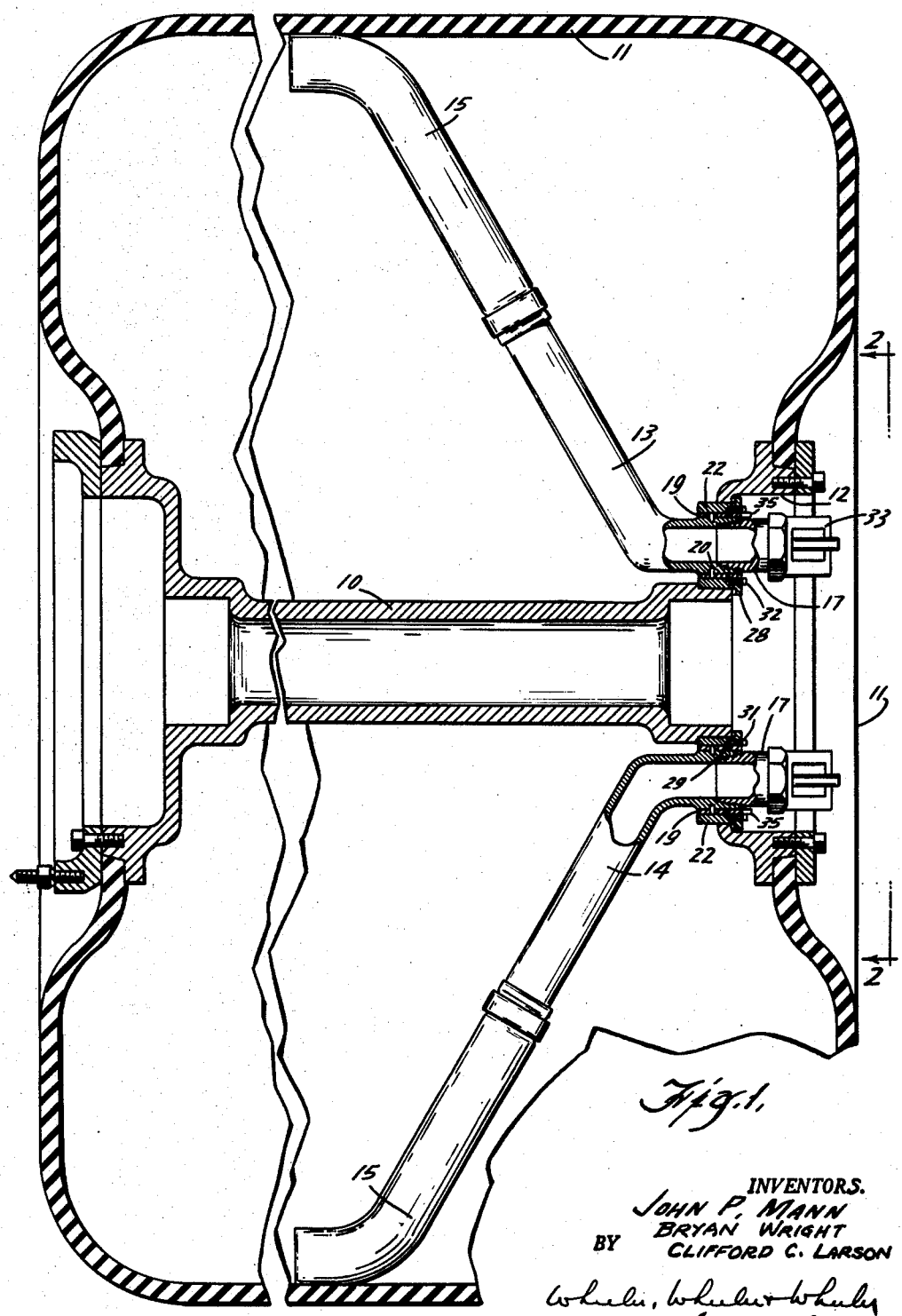
FIG. 1 is a vertical axial cross-sectional view of a wheel hub and tire of a rolling fluid transporter showing the hose swivel of our invention.
Figure 2:
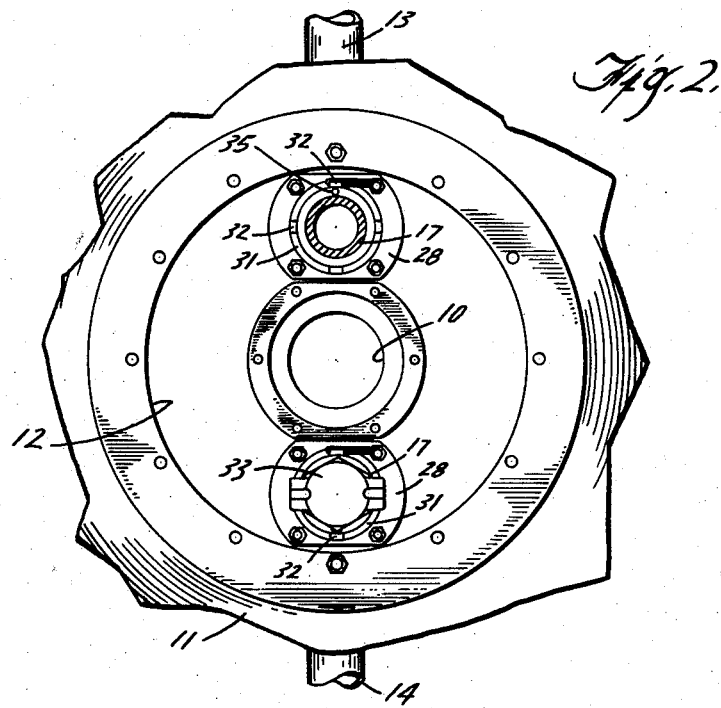
FIG. 2 is a fragmentary and elevational view of the wheel hub and tire of FIG. 1.
Figure 3:
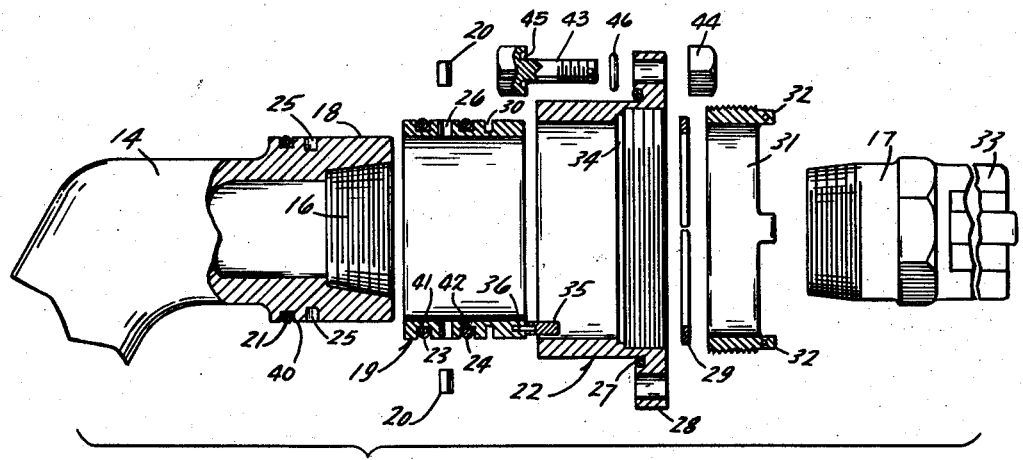
FIG. 3 is an exploded view of our hose swivel, with portions broken away.

The drawings show a wheel hub 10 and tire 11 of a rolling fluid transporter designed to carry a large volume of liquid within the tire casing. The end of hub 10 is provided with a recess 12 within which a pair of elbow fittings 13 and 14 are mounted, each of which is provided with a flexible hose 15 for filling and emptying tire casing 11. Depending upon the position of hub 10, either of the elbows 13, 14 may be rotated so that its associated hose 15 is either substantially at the top of tire casing 11 to serve as an air vent, or substantially at the bottom of the casing to fill or empty the casing with liquid. The outer end of each elbow 13, 14 is threaded to receive any conventional fitting 17 for attachment to an external pipe or hose. Fitting 17 may be a conventional quick-disconnect fitting, and will not be further described.

The outer end of each aluminum elbow has a cylindrical surface 18 to receive a concentric steel inner bearing sleeve 19 which is secured to the elbow by means of pins 20 in bores 25 and 26. A fluid tight connection is assured by an O-ring 21 which is received in a groove 40 in the elbow. The inner bearing sleeve 19 is rotatably supported in a concentric outer bearing sleeve 22 bolted to the flat vertical surface of the recess 12 of the wheel hub 10. Outer bearing sleeve 22 is sealed with respect to inner bearing ring 19 by two O-rings 23, 24 received in circumferential grooves 41 and 42 on the inner bearing sleeve 19 and is sealed with respect to wheel hub 10 by means of an O-ring 27 at the base of bolt flange 28 of sleeve 22, bearing axially on the wheel hub recess 12. The two parts 19, 22 of the steel swivel bearing are maintained in assembled relationship by a snap-ring 29 which is received in a groove 30 in inner bearing sleeve 19, and is received in an annular recess 34 in the outer bearing sleeve 22. The snap-ring 29 is retained axially in recess 34 by screw-threaded retaining ring 31 provided with axial projections 32 around its circumference for engagement with a spanner.

All of the bearing members are so nested that the quick-disconnect fittings 17 may be screwed directly into the interior of elbows 13 and 14. When the transporter is in motion, and at other times when it is not being filled or emptied, cap 33 is provided for quick-disconnect (or other) fitting 17 to prevent leakage, and to protect the valve mechanism inside a quick-disconnect fitting. Cap 33 may also be provided with projections to assist the operator in obtaining a good grip, in order to position the elbow within the tire casing to prepare for a filling or emptying operation.

Indicator 35 is pinned at 36 to sleeve 19 opposite the radially extending position of each elbow 13, 14 to indicate the angular adjustment of the elbow to the operator.

The snap-ring retainer is provided with holes for retaining wires, as are the bolts 43 and nuts 44 which secure flange 28 to hub 10. The bolts 43 are of the type provided with an O-ring groove 45 and O-ring 46 to assure a fluid tight seal at the bolt head. Disassembly is accomplished by removing the wires and nuts, whereupon the entire bearing assembly and elbow may be withdrawn from hub 10.

The structure described functions to provide a steel bearing between a hub and a rotatable bearing of softer materials, at the same time confining the liquid cargo within the tire and hub. It also permits disassembly without removal of the tire.

We claim:

1. A rotatable fluid carrier having an axis of rotation and a fluid enclosing wall provided with an opening to receive a hose swivel, said hose swivel comprising a soft metal pipe elbow, the centers of said opening and said hose swivel being displaced radially from said axis of rotation, and concentric inner and outer hard metal bearing sleeves rotatably supporting said elbow on said wall, said elbow having a first portion aligned with said bearing sleeves, the inner said bearing sleeve being in fluid tight non-rotatable connection with said first portion of said elbow, the outer said bearing sleeve being in fluid tight non-rotatable connection with said wall, and said bearing sleeves being in rotatable fluid tight circumferential bearing engagement with each other, said elbow having a second portion disposed at an angle to said first portion and to said bearing sleeves, said latter portion of said elbow being provided with an extension duct extending a substantial distance within said fluid carrier, one said bearing sleeve being provided with a circumferential groove, a snap-ring in said groove, the other said bearing sleeve being provided with a shoulder abutting said snap-ring on the inner side with respect to said wall and with a removably attached retainer abutting said snap-ring on the outer side with respect to said wall, whereby relative axial displacement of said inner and outer bearing sleeves is prevented by said snap-ring, said retainer being adapted to be removable from the side of said wall through which the portion of said inner bearing sleeve remote from the second portion of said elbow projects, to free said inner bearing sleeve and said elbow for unitary removal from said outer bearing sleeve.

2. A rotatable fluid carrier having an axis of rotation and a fluid enclosing wall provided with an opening to receive a hose swivel, said hose swivel comprising a soft metal pipe elbow, the centers of said opening and said hose swivel being displaced radially for said axis of rotation, and concentric inner and outer hard metal bearing sleeves rotatably supporting said elbow on said wall, said elbow having a first portion aligned with said bearing sleeves, the inner said bearing sleeve being in fluid tight non-rotatable connection with said first portion of said elbow, the outer said bearing sleeve being in fluid tight non-rotatable connection with said wall, and said bearing sleeves being in rotatable fluid tight circumferential bearing engagement with each other, said elbow having a second portion disposed at an angle to said first portion and to said bearing sleeves, said latter portion of said elbow being provided with an extension duct extending a substantial distance within said fluid carrier, one said bearing sleeve being provided with a circumferential groove, a snap ring in said groove, the other said bearing sleeve being provided with a shoulder abutting said snap-ring on the inner side with respect to said wall and with a removably attached retainer abutting said snap-ring on the outer side with respect to said wall, whereby relative axial displacement of said inner and outer bearing sleeves is prevented by said snap-ring, said retainer being adapted to be removable from the side of said wall through which the portion of said inner bearing sleeve remote from the second portion of said elbow projects, to free said inner bearing sleeve and said elbow for unitary removal from said outer bearing sleeve, said outer bearing sleeve projecting through said wall and being provided with a radial bolt flange outside said wall, bolts having their heads on the side of the wall nearest to the bent portion of said elbow and extending through said wall and said flange, sealing mans between said heads and said wall, and nuts on said bolts at the side of said flange remote from said bent portion of said elbow, whereby said bearing members and the elbow may be withdrawn axially outwardly from the side of said wall which is remote from the bent portion of said elbow without access to the other side of said wall.

References Cited by the Examiner

UNITED STATES PATENTS

| | | | |
|---|---|---|---|
| 1,794,454 | 3/31 | Green | 285—272 |
| 2,458,614 | 1/49 | Malchus | 285—189 |
| 2,521,127 | 9/50 | Price | 285—347 |
| 2,635,931 | 4/53 | May | 285—321 |
| 2,752,814 | 7/56 | Iaia. | |
| 2,770,475 | 11/56 | Rafferty | 285—281 |
| 2,793,830 | 5/57 | Nakaji et al. | 285—354 |
| 2,818,284 | 12/57 | Stevens | 277—65 |
| 2,835,305 | 5/58 | Boyer | 285—190 |
| 2,863,680 | 12/58 | Taltavall | 277—65 |
| 2,974,970 | 3/61 | Tuttle et al. | |

FOREIGN PATENTS

| | | |
|---|---|---|
| 1,225,431 | 2/60 | France. |

CARL W. TOMLIN, *Primary Examiner.*

GEORGE HYMAN, JR., *Examiner.*

UNITED STATES PATENT OFFICE
CERTIFICATE OF CORRECTION

Patent No. 3,191,974                            June 29, 19(

John P. Mann et al.

It is hereby certified that error appears in the above numbered patent requiring correction and that the said Letters Patent should read as corrected below.

Column 2, line 68, for "for" read -- from --; column 3, line 27, for "mans" read -- means --.

Signed and sealed this 30th day of November 1965.

(SEAL)
Attest:

ERNEST W. SWIDER                                EDWARD J. BRENNER
Attesting Officer                                    Commissioner of Patents